(12) United States Patent  
Kusase

(10) Patent No.: US 7,064,466 B2
(45) Date of Patent: Jun. 20, 2006

(54) BRUSHLESS ROTARY ELECTRIC MACHINE HAVING TANDEM ROTARY CORES

(75) Inventor: Shin Kusase, Obu (JP)

(73) Assignee: Denso Corporation, Kariya (JP)

( * ) Notice: Subject to any disclaimer, the term of this patent is extended or adjusted under 35 U.S.C. 154(b) by 363 days.

(21) Appl. No.: 10/300,026

(22) Filed: Nov. 20, 2002

(65) Prior Publication Data

US 2003/0102758 A1 Jun. 5, 2003

(30) Foreign Application Priority Data

Nov. 27, 2001 (JP) .................................... 2001-360903
Jul. 12, 2002 (JP) .................................... 2002-204080

(51) Int. Cl.
*H02K 21/12* (2006.01)

(52) U.S. Cl. .............................. 310/156.66; 310/156.69; 310/263

(58) Field of Classification Search ................. 310/156.56–156.73, 310/216–217, 254, 261, 310/263–265
See application file for complete search history.

(56) References Cited

U.S. PATENT DOCUMENTS

| 4,959,577 | A | * | 9/1990 | Radomski ................... 310/263 |
| 5,672,926 | A | * | 9/1997 | Brandes et al. ............. 310/181 |
| 5,682,073 | A | | 10/1997 | Mizuno |
| 5,936,326 | A | | 8/1999 | Umeda et al. |
| 5,952,749 | A | | 9/1999 | Umeda et al. |
| 5,955,810 | A | | 9/1999 | Umeda et al. |
| 5,965,965 | A | | 10/1999 | Umeda et al. |
| 5,982,068 | A | | 11/1999 | Umeda et al. |
| 5,986,375 | A | | 11/1999 | Umeda et al. |
| 5,994,813 | A | | 11/1999 | Umeda et al. |
| 5,998,903 | A | | 12/1999 | Umeda et al. |
| 6,011,332 | A | | 1/2000 | Umeda et al. |
| 6,020,669 | A | | 2/2000 | Umeda et al. |
| 6,051,906 | A | | 4/2000 | Umeda et al. |
| 6,091,169 | A | | 7/2000 | Umeda et al. |
| 6,097,130 | A | | 8/2000 | Umeda et al. |
| 6,124,660 | A | | 9/2000 | Umeda et al. |
| 6,137,201 | A | | 10/2000 | Umeda et al. |
| 6,144,136 | A | | 11/2000 | Umeda et al. |
| 6,181,043 | B1 | | 1/2001 | Kusase et al. |
| 6,181,045 | B1 | | 1/2001 | Umeda et al. |
| 6,197,226 | B1 | | 3/2001 | Amagai et al. |
| 6,198,190 | B1 | | 3/2001 | Umeda et al. |
| 6,268,678 | B1 | | 7/2001 | Asao et al. |
| 6,291,918 | B1 | | 9/2001 | Umeda et al. |
| 6,366,000 | B1 | | 4/2002 | Higashino et al. |
| 6,373,163 | B1 | | 4/2002 | Oohashi et al. |

(Continued)

FOREIGN PATENT DOCUMENTS

| JP | 1-170352 | 7/1989 |
| JP | 8-140214 | 5/1996 |
| JP | 11-285217 | 10/1999 |

*Primary Examiner*—Thanh Lam
(74) *Attorney, Agent, or Firm*—Oliff & Berridge, PLC

(57) ABSTRACT

A brushless rotary electric machine includes a stator having an annular armature core with first radial teeth at the outer periphery thereof and second radial teeth at the inner periphery thereof and an armature winding wound between the teeth, a rotor having a pair of first and second rotary cores disposed tandem in the axial direction thereof, and a field coil. Each of the first and second rotary cores has a pair of coaxial outer and inner cylindrical pole members respectively facing the first and second radial teeth, a center core and a disk member magnetically connecting the pair of coaxial cylindrical pole members and the center core. The stator is accommodated by a first space defined by the outer and inner cylindrical members of the pair of first and second rotary cores. The field coil is accommodated by a second space defined by the inner cylindrical pole member and the center core of the first and second rotary cores.

4 Claims, 8 Drawing Sheets

U.S. PATENT DOCUMENTS

| | | |
|---|---|---|
| 6,396,185 B1 | 5/2002 | Asao et al. |
| 6,455,972 B1 | 9/2002 | Asao et al. |
| 6,459,186 B1 | 10/2002 | Umeda et al. |
| 6,459,187 B1 | 10/2002 | Oohashi et al. |
| 6,501,204 B1 | 12/2002 | Oohashi et al. |
| 6,501,205 B1 | 12/2002 | Asao et al. |
| 6,504,283 B1 | 1/2003 | Asao et al. |
| 6,531,799 B1 * | 3/2003 | Miller ........................ 310/114 |
| 6,687,974 B1 | 2/2004 | Asao et al. |
| 6,700,279 B1 | 3/2004 | Uchiyama et al. |
| 6,760,965 B1 | 7/2004 | Asao et al. |
| 2002/0047478 A1 | 1/2002 | Higashino et al. |
| 2002/0047486 A1 | 4/2002 | Asao et al. |
| 2003/0159272 A1 | 8/2003 | Fujita et al. |

* cited by examiner

BRUSHLESS ROTARY ELECTRIC MACHINE HAVING TANDEM ROTARY CORES

CROSS REFERENCE TO RELATED APPLICATION

The present application is based on and claims priority from Japanese Patent Applications 2001-360903, filed Nov. 27, 2001, and 2002-204080, filed Jul. 12, 2002, the contents of which are incorporated herein by reference.

BACKGROUND OF THE INVENTION

1. Field of the Invention

The present invention relates to a brushless rotary electric machine and, particularly, a field-coil type rotary electric machine having permanent magnets to be directly connected to an engine.

2. Description of the Related Art

A common field-coil type AC generator (or alternator) that has a rotor with a plurality of claw poles and a field coil, brushes and slip rings has two air gaps in a magnetic circuit, while a brushless field-coil type AC generator has four air gaps in a magnetic circuit. Although such a brushless rotary electric machine is excellent at operation without maintenance work, it can not generate as much output power as a common rotary electric machine having brushes and slip rings because of more air gaps. A plurality of permanent magnets can be substituted for the field coil to reduce the number of air gaps. However, it is difficult to control the magnetic flux supplied to the armature winding or the output voltage thereof.

SUMMARY OF THE INVENTION

Therefore, the present invention has been made in view of the above problems.

A main object of the invention is to provide an improved brushless rotary electric machine that can generate sufficient output power at controlled voltage.

Another object of the invention is to provide a compact brushless rotary electric machine having a plurality of permanent-magnet poles whose magnetic field can be controlled as desired.

According to a main feature of the invention, a rotor of a brushless rotary electric machine has a pair of rotary cores disposed tandem. Each rotary core has a center core portion carried by a rotary shaft and an annular space formed around the center core portion for accommodating a field coil. A plurality of permanent magnets is disposed on the surface of each rotary core at equal intervals in the circumferential direction so that each of the permanent magnets on one of the rotary core is disposed at an angular position between two of the permanent magnets on the other rotary core. The above feature can improve the above-described problem. Because the field coil is accommodated in an annular space around the center core, the field coil can have a sufficient number of turns with low resistance thereof.

Each of the rotary cores may be comprised of an annular pole member made of a plurality of laminated iron sheets, which has a plurality of slots for accommodating the permanent magnets. Preferably, an auxiliary permanent magnet is disposed between the rotary cores near the pole surface and magnetized to prevent leakage of magnetic flux of the rotating magnetic field.

According to another feature of the invention, a brushless rotary electric machine includes a stationary housing, a stator disposed in the stationary housing and having a pair of armature cores disposed tandem, a rotor having a pair of rotary cores disposed tandem, an annular field coil disposed in a space formed by the annular space of the pair of rotary cores, and a support member extending from the housing through a space between the pair of armature cores into the annular space to suspend the field coil. Each rotary core has a pole surface facing one of the armature cores through an air gap, a center core portion and an annular space around the center core portion for accommodating the field coil. A plurality of permanent magnets is disposed on the pole surface of each rotary core at equal intervals in the circumferential direction thereof so that each of the permanent magnets on one of the rotary cores is disposed at an angular position between two of the permanent magnets on the other rotary core.

According to another feature of the invention, a brushless rotary electric machine includes an armature, a pair of rotary cores disposed tandem to surround the armature from radially outside, a stationary center core portion having an annular groove on the peripheral surface thereof and an annular field coil disposed in the annular groove. Each rotary core has a pole surface facing the armature through an air gap, a plurality of permanent magnets disposed on the pole surface of each the rotary cores at equal intervals in the circumferential direction thereof so that each of the permanent magnets on one of the rotary cores is disposed at an angular position between two of the permanent magnets on the other rotary core. Therefore, the permanent magnets are disposed inside the rotary cores, so that the rotor can be highly resistant to centrifugal force during high speed operation.

According to another feature of the invention, a brushless rotary electric machine is comprised of a stationary housing, a stator having an armature core and an armature winding, a rotor having a pair of first and second rotary cores and a field coil disposed in a space enclosed by the first and second rotary cores for supplying magnetic flux to the pole surfaces of the first and second rotary cores. In this brushless rotary electric machine, each of the first and second rotary cores may have a boss member, a pair of outer and inner cylindrical pole members extending from the boss member, the field coil is disposed in the space formed by the boss member and inner cylindrical pole member and the armature core and armature winding are disposed in a space formed by the outer cylindrical member and the inner cylindrical member. Further, the first and second rotary cores may be disposed tandem in the axial direction of the rotor. Each of the outer and inner cylindrical core members may have a plurality of permanent magnets disposed at equal intervals in the circumferential direction of the rotor. In addition, each of the first and second rotary cores may have a plurality of vents for cooling the armature winding.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Figure 1:
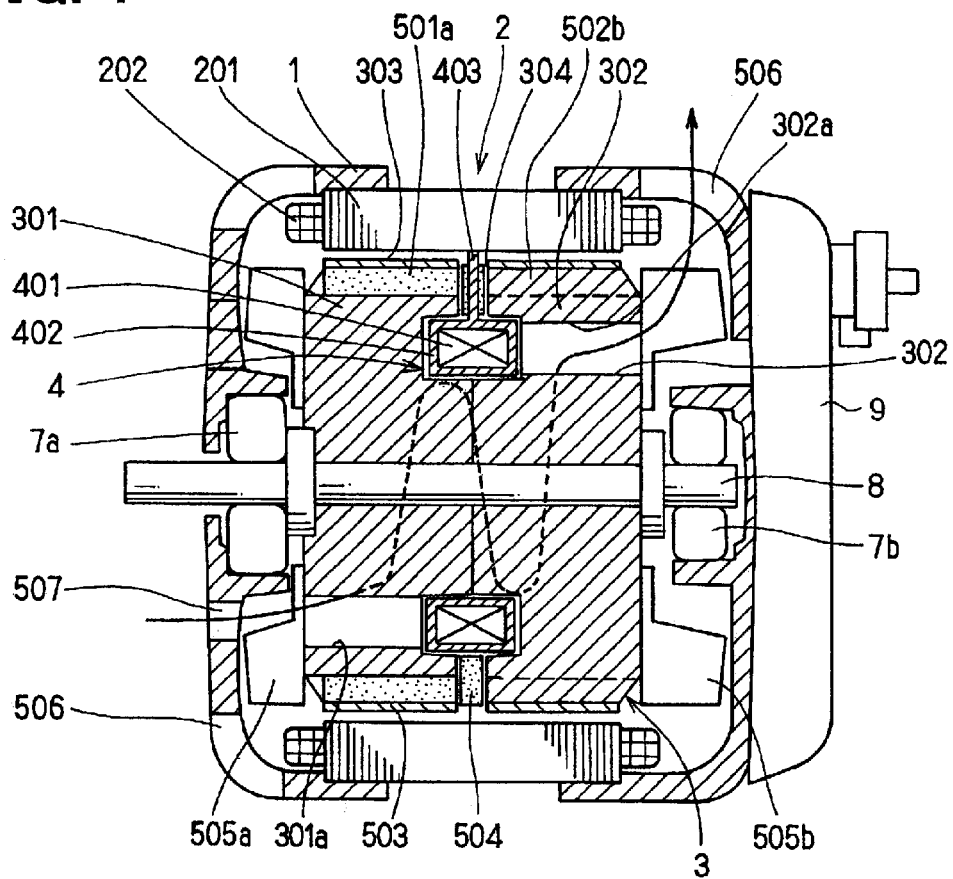
FIG. 1 is a schematic cross-sectional side view of a brushless rotary electric machine according to the first embodiment of the invention.

Various brushless rotary electric machines according to preferred embodiments of the invention are described with reference to the appended drawings.

A brushless ac generator according to the first embodiment of the invention is described with reference to FIGS. 1, 2 and 5.

The brushless ac generator according to the first embodiment is comprised of a housing 1, an armature or a stator 2, a rotor 3, a field coil unit 4, a pair of bearings 7a, 7b that supports a shaft 8 and a rear cover 9. A pulley (not shown) is carried by the shaft to transmit torque of an engine to the shaft 8 and the rotor 3 via a belt.

Figure 5:
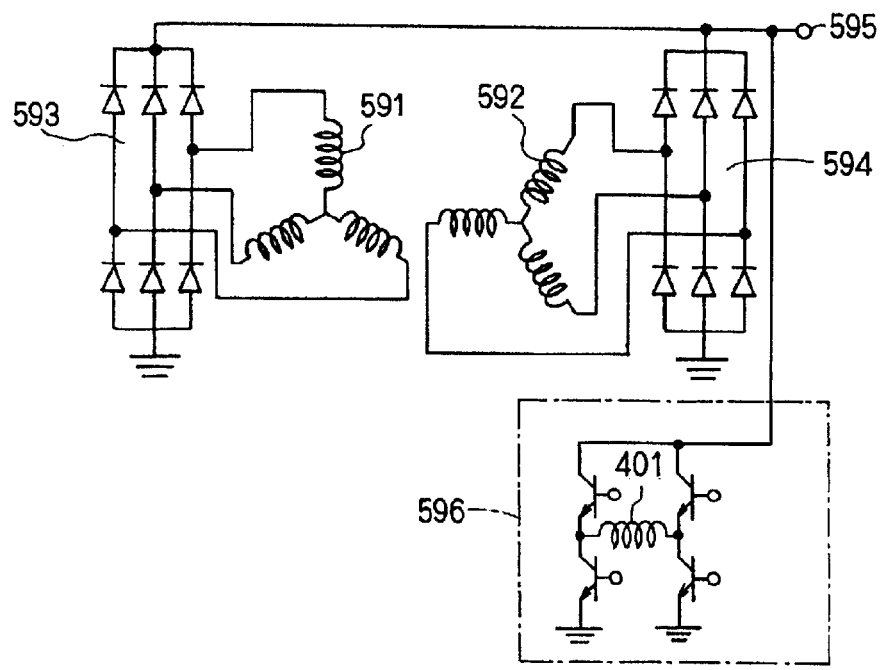
FIG. 5 is an example of a circuit diagram of a rotary electric machine according to the invention.

The armature 2 includes an annular armature core 201 that is made of laminated iron sheets and has an axial length of 35 mm and an outside diameter of 135 mm, an armature winding 202 that includes first and second three-phase windings 591, 592, as shown in FIG. 5. The armature core 201 has a plurality of radial teeth formed at the inner surface thereof. Each of the three-phase windings 591, 592 is comprised of flat conductors accommodated in a plurality of slots formed between the teeth of the armature core 201 at a space factor of about 75%. The three phase windings 591, 592 are respectively connected to three-phase full-wave rectifier units 593, 594 to provide DC power at a terminal 595, as shown in FIG. 5.

A portion of the output power of the rectifier units 593, 594 is supplied to a H-bridge circuit 596 formed of four transistors. The H-bridge circuit 596 supplies positive or negative DC power to the field coil 401 according to the output voltage of the output terminal 595. The rectifier units 593, 594 and the H-bridge circuit 596 are housed in the rear cover 9.

The rotor 3 includes a pair of first and second rotary pole cores 301, 302, which are made of soft magnetic material and disposed tandem in the axial direction to have an axial length of about 65 mm. The rotor 3 is disposed in the inner space of the annular armature core 201 to face teeth formed between the slots of the armature core 201 through a suitable air gap 303 (e.g. 0.5 mm).

The first and second rotary pole cores 301, 302 respectively have center boss portions that are fitted to the shaft 8 to abut on each other within a gap of about tens to hundreds micro meters, thereby providing magnetic connection, and have cylindrical pole portions that are spaced apart from each other at an axial space 304.

A pair of cooling fans 505a, 505b is fixed to the opposite ends of the rotor 3, and air intake windows 507 and air discharge windows vents 506 are formed in the housing 1 at the portions thereof corresponding to the cooling fan 505a.

Each of the first and second rotary pole cores 301, 302 has a plurality of axial wedge-shaped or dovetail grooves formed at the cylindrical pole portion in the circumferential direction at equal intervals. As shown in FIG. 2, each of the dovetail grooves of the first rotary core 301 is formed at an angular position between each pair of neighboring dovetail grooves of the second rotary pole core 302.

Permanent magnets 501a, 501b are respectively fitted to the grooves, and thin (e.g. 0.3 mm) cover bands 503 made of non-magnetic stainless cover the outer peripheries of the first and second rotary pole cores 301, 302. All the permanent magnets 501a fitted to the first rotary pole core 301 are magnetized so that the surfaces thereof form S-poles, and all the permanent magnets 501b fitted to the second rotary pole core 302 are magnetized so that the surfaces thereof form N-poles.

The permanent magnets 501 are magnetically connected to the first and second rotary pole cores 301, 302 respectively at base portions 391, 392 adjacent the bottom thereof. Therefore, the peripheral surfaces (cylindrical pole portions) of the first rotary pole core 301 between the permanent magnets 501a form N-poles 502a (hereinafter called as non-magnet N-poles) and the peripheral surfaces of the second rotary pole core 302 between the permanent magnets 501b form S-poles 502b (hereinafter called as non-magnet S-poles).

The field coil unit 4 includes an annular field coil 401 and a bobbin 402 that supports and protects the field coil 401 and a bobbin support 403 that has a plurality of spokes radially extending from the armature core 201 through the axial space 304 to support the bobbin 402 at an end. The other end of the bobbin support 403 is sandwiched between laminated iron sheets of the armature core 201, so that the field coil unit 4 is suspended in the axial space 304. This arrangement is effective to reduce the length of each turn of the field coil, so that resistance of the field coil can be reduced. The field coil 401 has an axial thickness of about 20 mm and provides a rated magnetomotive force of about 1600 AT.

The bobbin support 403 also supports a generally ring-shaped rare-earth-metal permanent magnet 504, such as a neodymium-boron-iron permanent magnet, disposed in the axial space 304 (e.g. 6 mm) between the peripheral portions of the first and second rotary pole cores 301, 302 at a distance of about 1 mm therefrom. The ring-shaped permanent magnet 504 is magnetized to form magnetic fields opposite the magnetic fields that are formed between the first and second rotary poles cores 301, 302, thereby preventing leakage of the magnetic flux to be supplied to the armature winding 202. Therefore, the number of the air gaps necessary in the magnetic circuit of the generator is 2.

Cooling air passages 301a, 302a are formed in the rotary pole cores 301, 302 at portions thereof corresponding to the air intake windows 507 and the air discharge windows 506 so that cooling air flows into the cooing air passes 301a through the axial space 304 to cool the field coil 401 and flows out of the cooling air passages 302a toward the air discharge windows 506, as indicated by a dotted line in FIG. 1.

When the rotor 3 is rotated by an engine via a belt and a pulley, the rotor supplies rotating magnetic field from the permanent magnets 501a, 502a to the armature winding 202 generates ac voltage even if field current is not supplied to the field coil 401.

When a full amount of the field current is supplied to the field coil 401 in the direction to strength the magnetic field of the non-magnet N-poles 502a and non-magnet S-poles 502b, the armature winding 202 generates full ac power. On the other hand, when a full amount of the field current is supplied to the field coil in the direction to weaken the magnetic field of the non-magnet N-poles 502a and non-magnetic S-poles 502b, the output power of the armature winding 202 decreases to zero because all the magnetomotive force of the permanent magnets 501a, 501b are cancelled by the magnetomotive force of the field coil 401.

Figure 3:
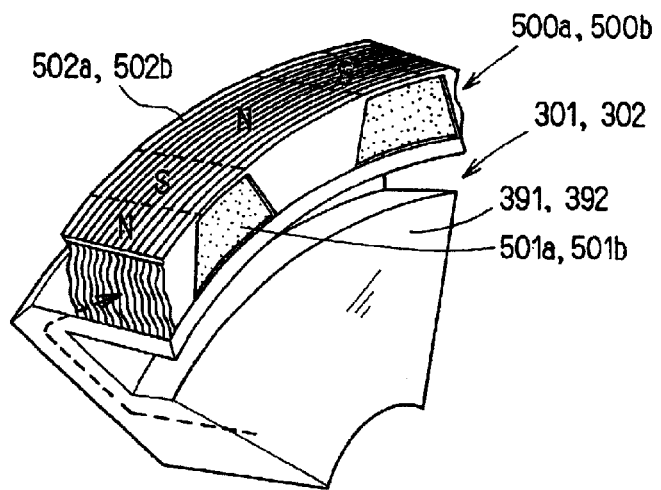
FIG. 3 is a fragmentary perspective view of a rotor of a rotary electric machine according to the second embodiment of the invention.

A brushless ac generator according to the second embodiment of the invention is described with reference to FIG. 3.

Each of the first and second rotary pole cores 301, 302 has an annular or cylindrical pole member 500a or 500b made of laminated iron sheets and a generally disk-like magnet-conductive base member 391 or 392. Each of the annular pole members 500a, 500b has a plurality of axial wedge-shaped or dovetail slots disposed in the circumferential direction at equal intervals. Each of the dovetail slots of the first rotary pole core 301 is formed at an angular position between each pair of neighboring dovetail grooves of the second rotary pole core 302.

Permanent magnets 501a, 501b are respectively fitted to the dovetail slots. All the permanent magnets 501a of the first rotary pole core 301 are magnetized so that the surfaces thereof form S-poles, as shown in FIG. 2. On the other hand, all the permanent magnets 501b of the second rotary pole core 302 are magnetized so that the surfaces thereof form N-poles (not shown). The permanent magnets 501 are magnetically connected to the base members 391, 392 adjacent the bottom thereof Therefore, the peripheral surfaces 502a of the annular pole member 500a between the permanent magnets 501a form N-poles as shown in FIG. 3, and the peripheral surfaces 502b of the second rotary pole core 302 between the permanent magnets 501b form S-poles (not shown).

The above arrangement can omit the cover band 503 of the first embodiment. The annular pole members 500a, 500b laminated, which are made of laminated iron sheets, can reduce eddy current loss caused by a high frequency magnetic field.

Figure 4:
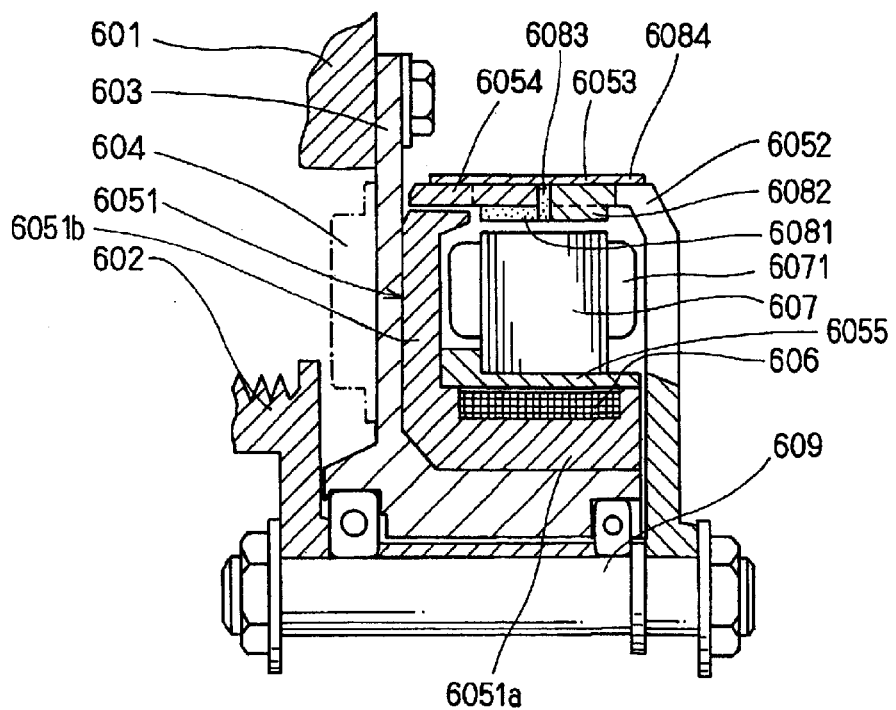
FIG. 4 is a fragmentary cross-sectional side view of a rotary electric machine according to the third embodiment of the invention.

A brushless ac generator according to the third embodiment of the invention is described with reference to FIG. 4.

The brushless ac generator according to the third embodiment is comprised of an aluminum die-cast housing 603, an armature 607, a rotor 6052, a field coil 606, a shaft 609 and a pulley 602 carried by the shaft 609 to transmit torque of at engine via a belt.

The armature 607 includes an armature winding 6071, a stationary field core 6051, an annular support 6055 which is fixed to the field core 6051. The field core 6051 has a cylindrical core portion 6051a and a disk portion 6051b and is fixed to the housing 603. The cylindrical core portion 6051a has an annular groove at the outer periphery in which the field coil 606 is fitted and covered by the annular support 6055. The peripheral portion of the disk portion 6061b is located near the open end of the rotor 6052 to provide magnetic connection between the field core 6051 and the rotor 6052.

The housing 603 is fixed to a portion of an engine housing 601.

The rotor 6052 is disposed around the armature 607 to face teeth formed between the slots of the armature 607 through a suitable air gap. The rotor 6052 includes first and second cylindrical pole cores 6053 and 6054, which are made of soft magnetic material and disposed tandem in the axial direction to face each other via an annular non-magnetic plate 6083.

Each of the first and second cylindrical pole cores 6053, 6054 has a plurality of permanent magnets 6081 and non-magnet poles 6082 alternately disposed thereon in the circumferential direction. Each of the permanent magnets 6081 of the first cylindrical pole core 6053 is located at an angular position between each pair of neighboring permanent magnets 6081 of the second rotary pole core 6054.

All the permanent magnets 6081 of the first cylindrical pole core 6053 are magnetized so that the surfaces thereof form one of S-pole and N-pole, and all the permanent magnets 6081 of the second cylindrical pole core 6054 are magnetized so that the surfaces thereof form the other pole.

Therefore, the non-magnet poles of the first and second cylindrical pole cores 6053, 6054 provide opposite polarity as described above.

This arrangement is strong in centrifugal force and provides wide cross-section of the air gap between the rotor 6052 and the armature 607.

Figure 6:
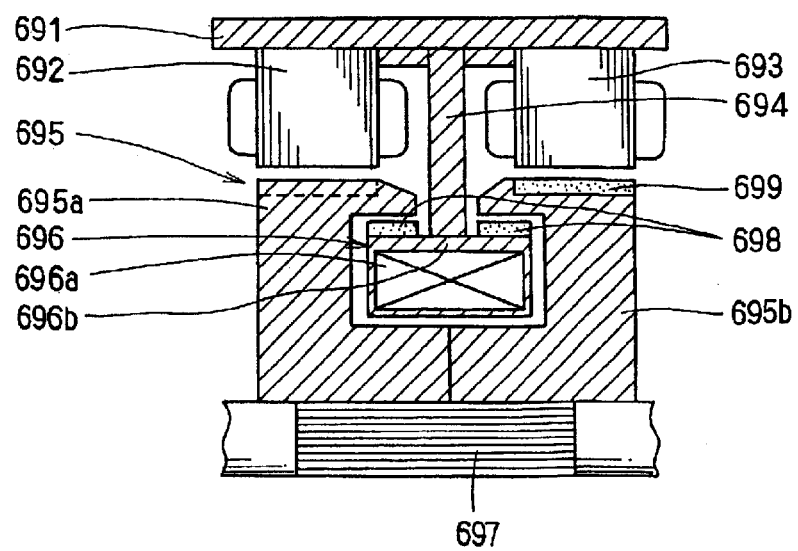
FIG. 6 is a fragmentary cross-sectional side view of a rotary electric machine according to the fourth embodiment of the invention.

A brushless ac generator according to the fourth embodiment of the invention is described with reference to FIG. 6.

The brushless ac generator according to the fourth embodiment is comprised of a housing 691, a pair of armatures 692 and 693, a rotor 695, a field coil unit 696 and a shaft 697. A pulley (not shown) is carried by the shaft to transmit torque of an engine via a belt.

The rotor 695 includes a pair of first and second rotary pole cores 695a and 695b, which are made of soft magnetic material and disposed tandem in the axial direction. The rotor 695 is disposed in the inner space of the pair of armatures 692, 693.

The first and second rotary pole cores 695a, 695b have center boss portions that are fitted to the shaft 697 so as to abut on each other to provide magnetic connection and have peripheral portions that are spaced apart from each other at an axial space. Each of the first and second rotary pole cores 695a, 695b has a plurality of dovetail grooves disposed in the circumferential direction at equal intervals. Each of the dovetail grooves of the first rotary core 695a is formed at an angular position between each pair of neighboring dovetail grooves of the second rotary pole core 695b.

A plurality of permanent magnets 699 are respectively fitted to the grooves. The permanent magnets 699 are magnetized in the same manner as those of the first embodiment. The peripheral surfaces of the first rotary pole core 695a between the permanent magnets 699 form magnetic poles of one polarity and the peripheral surfaces of the second rotary pole core 695b between the permanent magnets 699 from magnetic pole of the other polarity.

The field coil unit 696 includes an annular field coil 696a and a bobbin 696b made of magnetic material. A non-magnetic bobbin support 694 extends from the housing 691 between the armatures 692 and 693 through the axial space between the rotary pole cores 695a and 695b to support the bobbin 696b at an end to suspend the field coil unit 696 in the axial space. The bobbin support 694 also supports a pair of annular permanent magnets 698 disposed in the axial space between the first and second rotary pole cores 695a, 695b to form magnetic fields opposite the magnetic fields, thereby preventing leakage of the magnetic flux.

The operation of the fourth embodiment is substantially the same as the first embodiment. This embodiment can provide comparatively large permanent magnets for preventing leakage of the magnetic flux supplied to the armatures.

A brushless ac generator according to the fifth embodiment of the invention is described with reference to FIGS. 7–12.

The brushless ac generator according to the fifth embodiment is comprised of a stator 1 including an armature 2 and a plurality of armature supports 21, a rotor 3, a field coil unit 4, a pair of bearings 7a, 7b that supports a shaft 8, a drive frame 13, a rear frame 14, an output shaft 20 and a planetary gear speed change unit 22.

Figure 8:
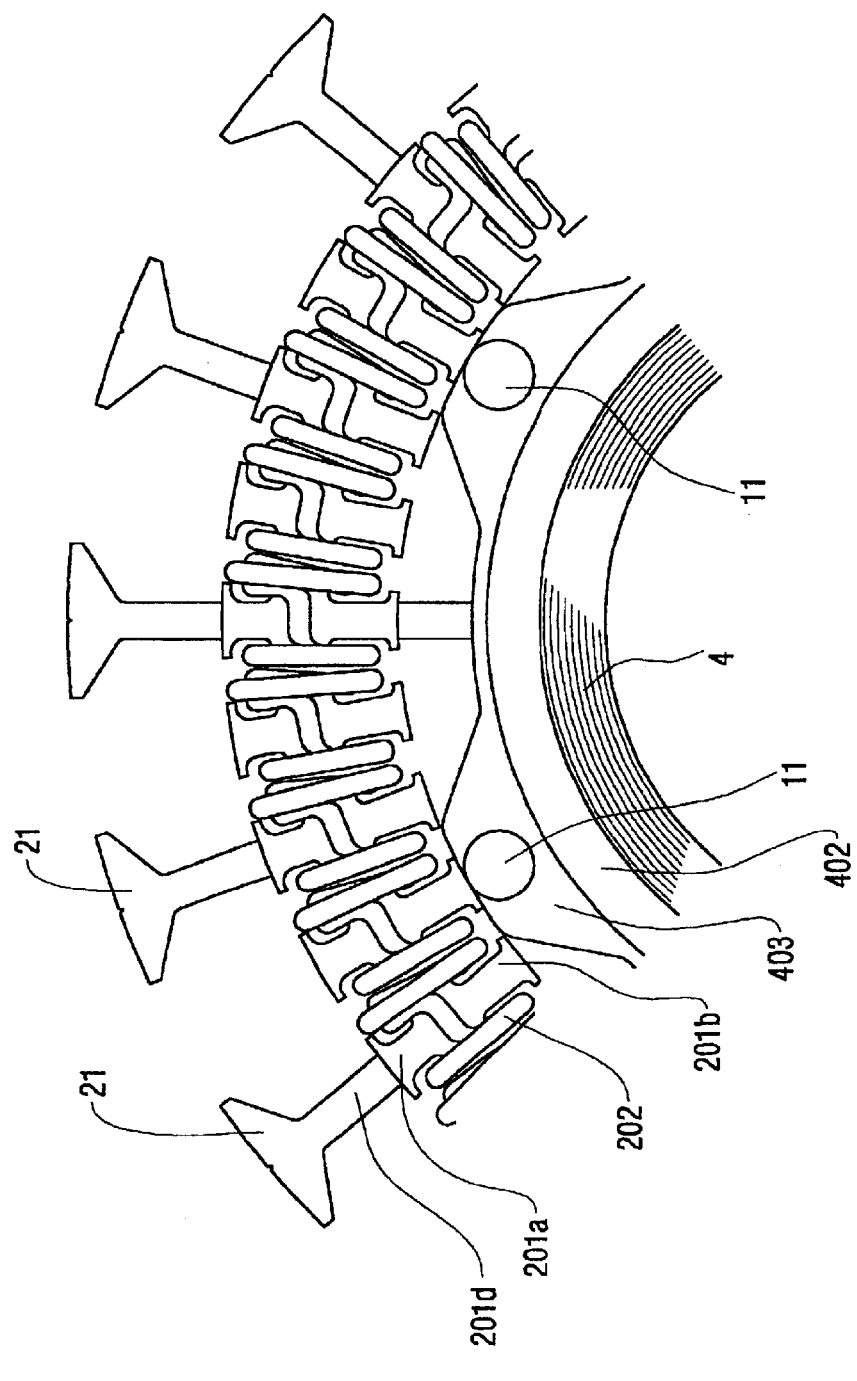
FIG. 8 is a fragmentary schematic diagram illustrating a main portion of a stator of the rotary electric machine according to the fifth embodiment.
Figure 9:
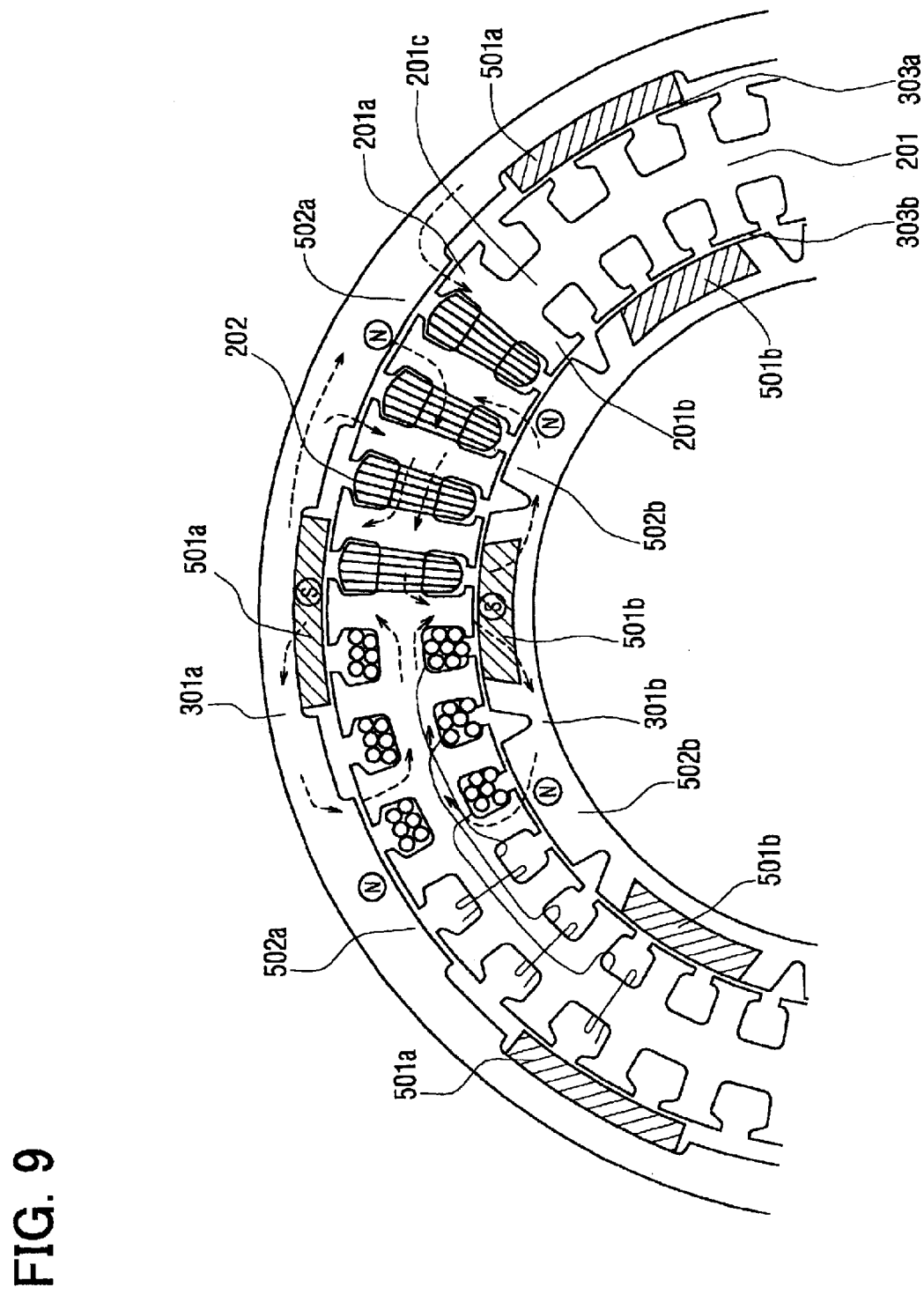
FIG. 9 is a fragmentary schematic diagram illustrating a main portion of the stator and a rotor of the rotary electric machine according to the fifth embodiment.

The armature 2 includes an annular armature core 201 that is made of laminated iron sheets and an armature winding 202. The armature core 201 has a plurality of outer teeth 201a that extends radially outward, a plurality of inner teeth 201b that extends radially inward and a circular connection portion 201c that connects the outer and inner teeth 201a, 201b together, as shown in FIG. 9. A plurality of radial armature supports 21 extends outward from the armature core 201, as shown in FIG. 8 and are sandwiched between the drive frame 13 and the rear frame 14 at one ends. The number of the armature supports 21 is about a half the number of the teeth 201a.

Figure 12:
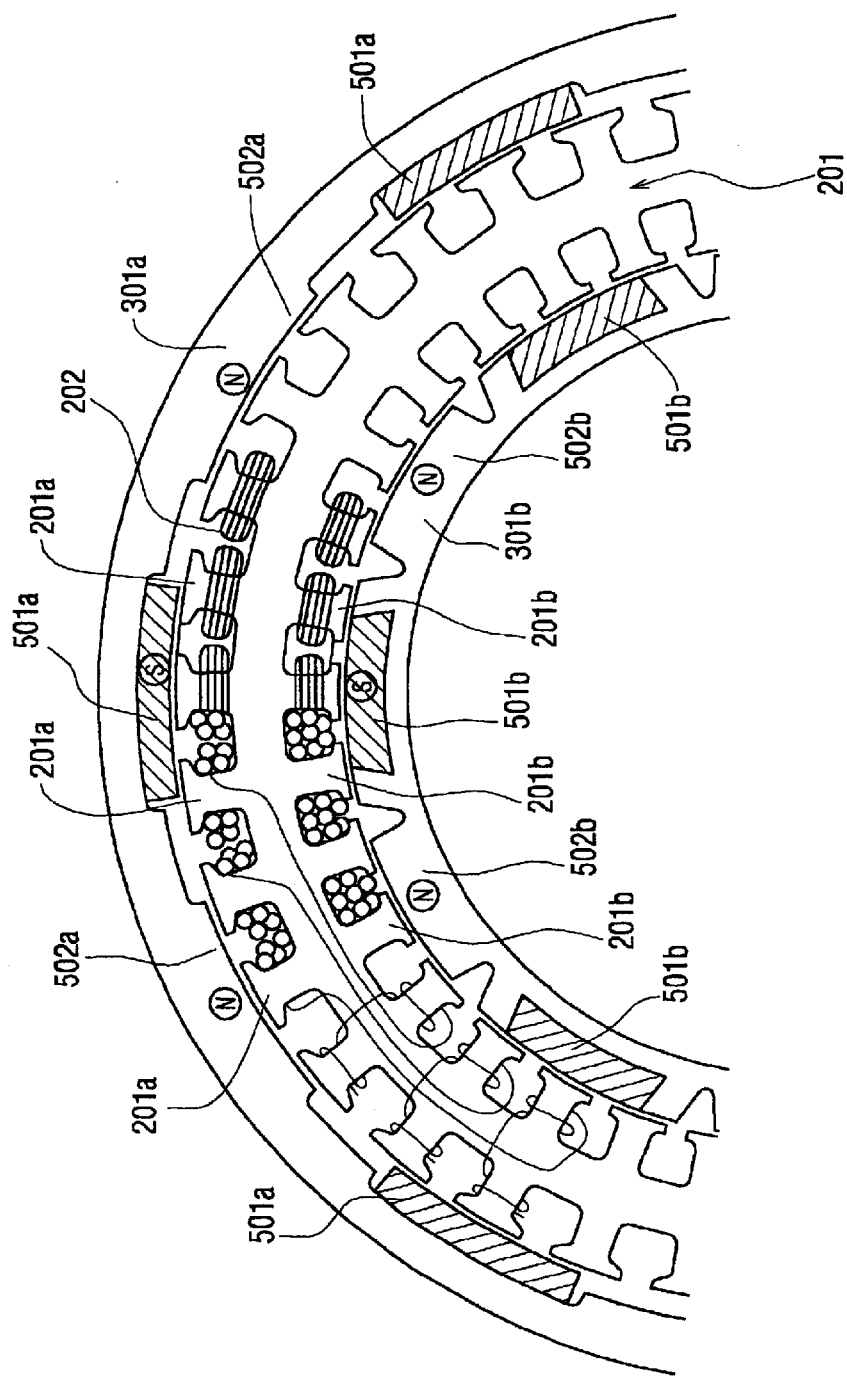
FIG. 12 is a fragmentary schematic diagram illustrating a main portion of a variation of the stator and the rotor of the rotary electric machine according to the fifth embodiment.

The armature winding 202 is a three-phase winding which is comprised of a plurality of toroidal coils wound around the connection portion between the outer and inner teeth 201a, 201b, as shown in FIG. 8. The armature winding 202 may be comprised of wave windings or lap windings respectively wound around the outer teeth 201a and the inner teeth 201b, as shown in FIG. 12.

Figure 7:
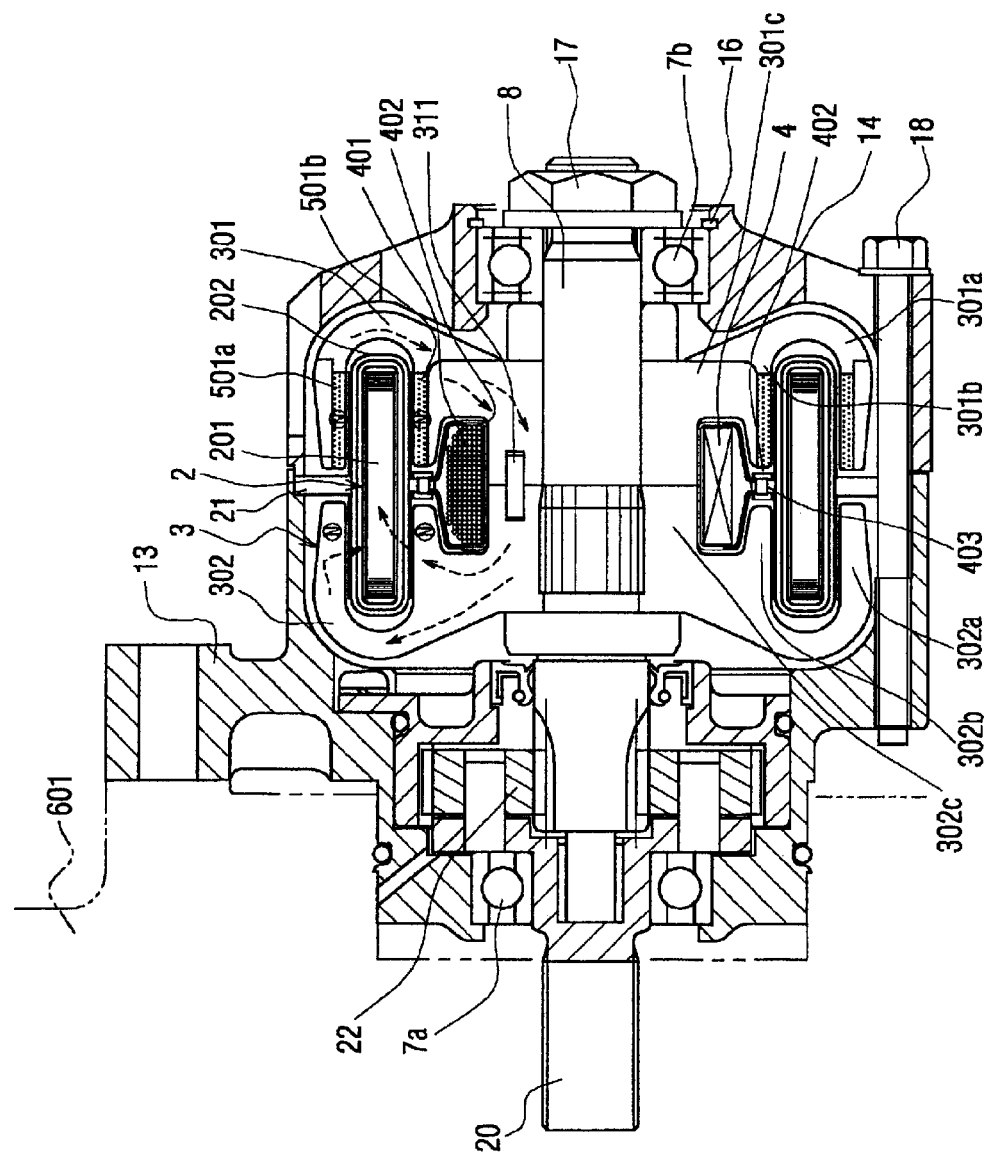
FIG. 7 is a cross-sectional side view of a rotary electric machine according to the fifth embodiment of the invention.

The rotor 3 includes a pair of first and second rotary pole cores 301, 302, which are made of soft magnetic material and disposed tandem in the axial direction, as shown in FIG. 7. The first and second rotary pole cores 301 respectively have outer cylindrical pole members 301a, 302a, inner cylindrical pole members 301b, 302b and boss members 301c and 302c. The outer and inner cylindrical pole members of the first and second rotary pole cores 301, 302 are integrally connected by a spoke-like member that extends radially outward from opposite axial ends of the boss members 301c, 302c. The boss members 301c, 302c are fixed together to be in close contact with each other by press-fitting the shaft 8 into the center hole thereof so that an outer cylindrical space can be formed between the outer cylindrical pole members 301a, 302a of the first rotary pole core 301 and the inner cylindrical pole members 301b, 302b of the second rotary pole core 302, and an inner cylindrical space can be formed between the inner pole members 310b, 302b and the boss members 301c, 302c. A pair of pins 311 is fitted into a pair of pinholes 301d so that the first and second rotary pole cores 301, 302 can be properly positioned in the circumferential direction.

The outer cylindrical space accommodates the armature 2 and the inner space accommodates the field coil unit 4, at a suitable distance from the walls of the first and second rotary pole cores 301, 302. An axial space is formed between the first pole core member 301 and the second rotary pole core 302 so that the armature supports 21 can extend through the axial space to support the armature 2.

Figure 10:
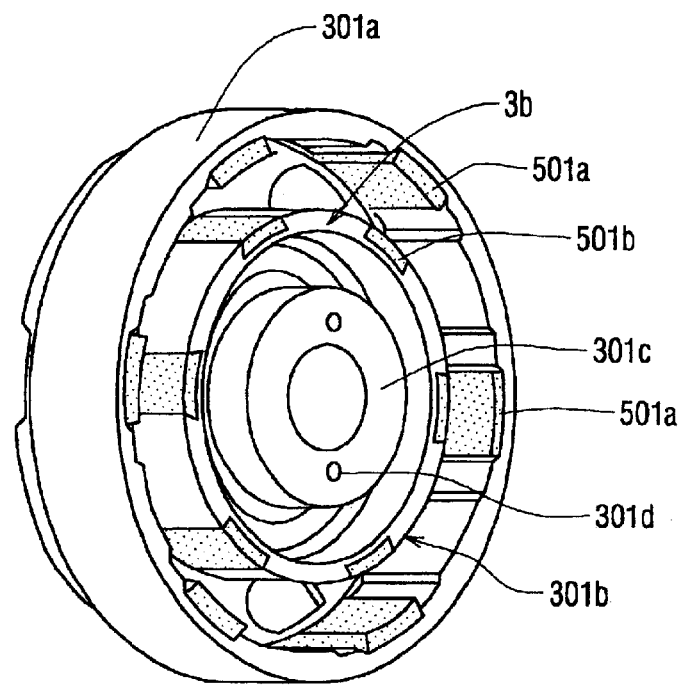
FIG. 10 is a perspective view of a rotary core of the rotary electric machine according to the fifth embodiment of the invention.

As shown in FIGS. 9 and 10, each of the outer cylindrical pole members 301a, 302a has six axial grooves at equal circumferential intervals on the inside surface and six permanent magnets 501a are respectively fixed to the grooves. Each of the inner cylindrical pole members 301b, 302b also has six axial grooves at equal circumferential intervals on the outside surface at the same angular positions as the outer cylindrical pole members 301a, 302a and six permanent magnets 501b are respectively fixed to the grooves. All the permanent magnets 501a, 501b fixed to the first rotary pole core 301 are magnetized so that the surfaces thereof form S-poles. Therefore, the surfaces of the outer and inner cylindrical poles members 301a, 301b of first rotary pole core 301, 302 between the permanent magnets 501a, 501b form N-poles 502a (hereinafter called as non-magnet N-poles). All the permanent magnets 501a, 501b fixed to the second rotary pole core 302 are magnetized so that the surfaces thereof form N-poles. Therefore, the peripheral surfaces of the outer and inner cylindrical poles members 302a, 302b of the second rotary pole core 302 between the permanent magnets 501a, 501b form S-poles (hereinafter called as non-magnet S-poles).

Figure 2:
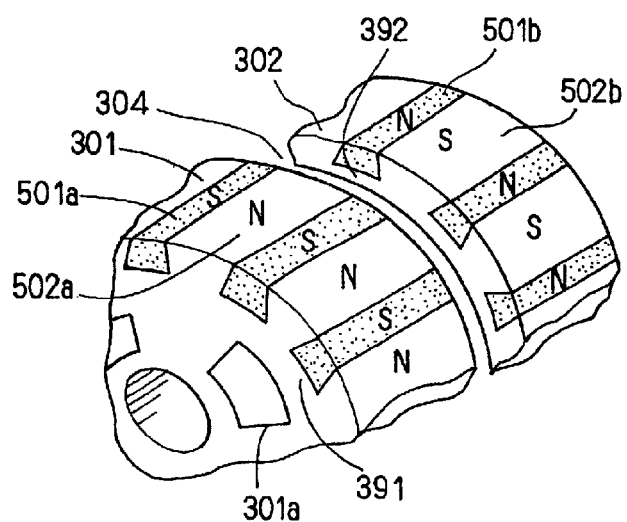
FIG. 2 is fragmentary perspective view of a rotor of the rotary electric machine shown in FIG. 1.
Figure 11:
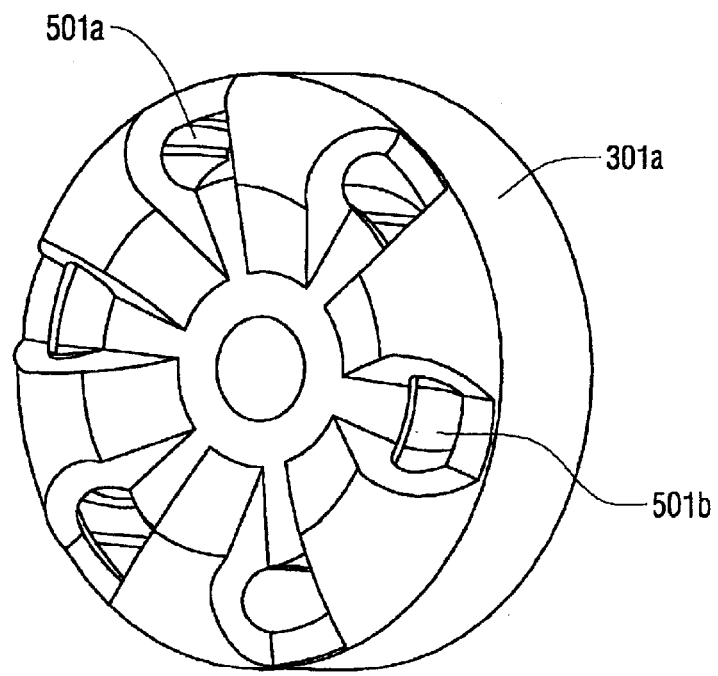
FIG. 11 is another perspective view of the rotary core shown in FIG. 10.

The first and the second rotary pole cores 301, 302 are fixed to each other so that the permanent magnets 501a, 501b of one of the rotary pole cores 301, 302 are disposed opposite the non-magnet poles 502a, 502b of the other rotary core, as shown in FIG. 2. In other words, the magnetic fields of the first and second rotary pole cores 301, 302 are shifted from each other by 30 degrees in angle. Therefore, non-magnet poles 502a, 502b are polarized by the field coil 401 when field current is supplied to the field coil 401. As shown in FIGS. 10 and 11, the outer cylindrical pole member 301a (or 302a) and the inner cylindrical core member 301b (or 302b) are integrally connected by the spoke member that has openings formed at portions corresponding to the permanent-magnets 501a, 501b. Therefore, cooling air is introduced into the space through the openings, where the armature winding 202 is disposed.

The field coil unit 4 includes an annular field coil 401 and a bobbin 402 that supports and protects the field coil 401 and a plurality of bobbin supports 403 that is fixed to the armature core by a plurality of rivets 11 at one end and extends from the armature core 201 through the axial space to support the bobbin 402 at the other end, as shown in FIG. 8. Thus, the field coil unit 4 is suspended in the inner cylindrical space at a suitable distance from the inner wall of the first and the second rotary pole cores 301, 302, as shown in FIG. 7.

The output shaft 20 is connected to a transmission that is connected to an engine. The planetary gear speed change unit 22 increases the rotation speed of the output shaft 20 transmitted from the transmission.

When the rotor 3 is rotated by an engine via the transmission, the output shaft 20 and the planetary gear speed change unit 22, the rotor supplies rotating magnetic field from the permanent magnets 501a, 502a to the armature winding 202. The armature winding 202 generates ac voltage even if field current is not supplied to the field coil 401. When a full amount of the field current is supplied to the field coil 401 in the direction to strength the magnetic field of the non-magnet N-poles 502a, 502b of the first rotary pole core 301 and non-magnet S-poles 502a, 502b of the second rotary pole core 302, the armature winding 202 generates full ac power. On the other hand, when a full amount of the field current is supplied to the field coil in the direction to weaken the magnetic field of the non-magnet N-poles 502a, 502b of the first rotary pole core 301 and non-magnetic S-poles 502*a*, 502*b* of the second rotary pole core 302, all the magnetomotive force of the permanent magnets 501*a*, 501*b* are cancelled by the magnetomotive force of the field coil 401, so that the output power of the armature winding 202 decreases to zero.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A brushless rotary electric machine including a stator having an armature winding, a rotor disposed to face said stator at an air gap for providing a rotating magnetic field, a shaft rotatably supporting said rotor and an annular field coil, wherein said rotor comprises:

a pair of rotary cores disposed tandem, each said rotary core having a pole surface facing said stator, a center core portion carried by said shaft and an annular space around said center core portion for accommodating said field coil;

a plurality of permanent magnets disposed on said pole surface of each said rotary core at equal intervals in the circumferential direction thereof so that each of said permanent magnets on one of said rotary core is disposed at an angular position between two of said permanent magnets on the other rotary core;

a permanent magnet disposed between said rotary cores near said pole surface magnetized to prevent leakage of magnetic flux of the rotating magnetic field.

2. The brushless rotary electric machine as claimed in claim 1, wherein each of said rotary cores comprises an annular pole member made of a plurality of laminated iron sheets, wherein said annular pole member has a plurality of slots for accommodating said permanent magnets.

3. The brushless rotary electric machine as claimed in claim 1, wherein said stator has a pair of armature cores disposed tandem.

4. The brushless rotary electric machine as claimed in claim 1, further comprising a support member extending in a radial direction to support said field coil.

* * * * *